United States Patent [19]

Lesher et al.

[11] 3,925,398

[45] Dec. 9, 1975

[54] 3-ACETYL-1,4-DIHYDRO-4-OXO-1,8-NAPHTHYRIDINES

[75] Inventors: George Y. Lesher; Ruth Pauline Brundage, both of Rensselaer, N.Y.

[73] Assignee: Sterling Drug Inc., New York, N.Y.

[22] Filed: Nov. 1, 1974

[21] Appl. No.: 520,135

Related U.S. Application Data

[62] Division of Ser. No. 453,928, March 22, 1974, Pat. No. 3,895,017, which is a division of Ser. No. 333,541, Feb. 20, 1973, Pat. No. 3,875,172.

[52] U.S. Cl.......................... 260/296 N; 260/295 N
[51] Int. Cl.².......................... C07D 471/04
[58] Field of Search...................... 260/295 N, 296 N

[56] References Cited
UNITED STATES PATENTS 3,873,554   3/1975   Lesher et al.................... 260/296 N

*Primary Examiner*—John D. Randolph
*Assistant Examiner*—Bernard I. Dentz
*Attorney, Agent, or Firm*—Robert K. Bair; B. Woodrow Wyatt

[57] ABSTRACT

Process of reacting 2-amino-6-Q'-pyridine (I) with lower-alkyl (lower-alkoxy)methyleneacetoacetate (II) to produce lower-alkyl α-(6-Q'-2-pyridylaminomethylene)acetoacetate (III'), heating lower-alkyl α-(6-Q-2-pyridylaminomethylene)acetoacetate (III), to produce 3-acetyl-1,4-dihydro-7-Q-4-oxo-1,8-naphthyridine (IV) which is tautomeric with 3-acetyl-4-hydroxy-7-Q-1,8-naphthyridine (IVA), reacting IV (or IVA) with a lower-alkylating agent to produce 3-acetyl-1-(lower-alkyl)-1,4-dihydro-7-Q-4-oxo-1,8-naphthyridine (V) and converting V to 1-(lower-alkyl)-1,4-dihydro-7-Q-4-oxo-1,8-naphthyridine-3-carboxylic acid (VI), where Q is lower-alkyl, hydroxymethyl, lower-alkanoyloxymethyl, 4(or 3)-pyridyl or 4(or 3)-pyridyl having one or two lower-alkyl substituents, and Q' is like Q but excluding lower-alkanoyloxymethyl. The compounds of formula VI are known antibacterial agents. Also given are alternative routes of preparing III and IV where Q is lower-alkanoyloxymethyl by reacting the N-oxides of III and IV, respectively, where Q is methyl with a lower-alkanoic acid anhydride.

4 Claims, No Drawings

3-ACETYL-1,4-DIHYDRO-4-OXO-1,8-NAPHTHYRIDINES

This application is a division of co-pending application Ser. No. 453,928, filed Mar. 22, 1974 and now U.S. Pat. No. 3,895,017, issued July 15, 1975, which in turn is a division of co-pending application Ser. No. 333,541, filed Feb. 20, 1973 and now U.S. Pat. No. 3,875,172, issued Apr. 1, 1975. This invention relates to steps in the process of preparing 1,8-naphthyridine-3-carboxylic acids and to compositions used therein.

The invention in a process aspect comprises the four steps of reacting 2-amino-6-Q'-pyridine (I) with lower-alkyl (lower-alkoxy)methyleneacetoacetate (II) to produce lower-alkyl α-(6-Q'-2-pyridylaminomethylene)acetoacetate (III'), heating lower-alkyl α-(6-Q-2-pyridylaminomethylene)acetoacetate (III), to produce 3-acetyl-1,4-dihydro-7-Q-4-oxo-1,8-naphthyridine (IV) which is tautomeric with 3-acetyl-4-hydroxy-7-Q-1,8-naphthyridine (IVA), reacting IV (or IVA) with a lower-alkylating agent to produce 3-acetyl-1-(lower-alkyl)-1,4-dihydro-7-Q-4-oxo- 1,8-naphthyridine (V) and converting V to 1-(lower-alkyl)-1,4-dihydro-7-Q-4-oxo-1,8-naphthyridine-3-carboxylic acid (VI), where Q is lower-alkyl, hydroxymethyl, lower-alkanoyloxymethyl, 4(or 3)-pyridyl or 4(or 3)-pyridyl having one or two lower-alkyl substituents, and Q' is like Q but excluding lower-alkanoyloxy- methyl. The compounds of formula VI are known antibacterial agents. In addition to said combination of the four steps, other process aspects of the invention are each individual step and the consecutive combinations of two or three steps.

The invention in its composition aspects resides in the compounds: lower-alkyl α-(6-Q-2-pyridylaminomethylene- acetoacetate of the formula III

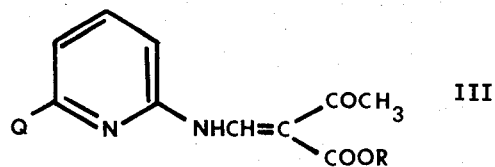

where R is lower-alkyl; 3-acetyl-1,4-dihydro-7-Q-4-oxo-1,8-naphthyridine and its tautomeric 3-acetyl-4-hydroxy-7-Q-1,8-naphthyridine of the respective formulas IV and IVA

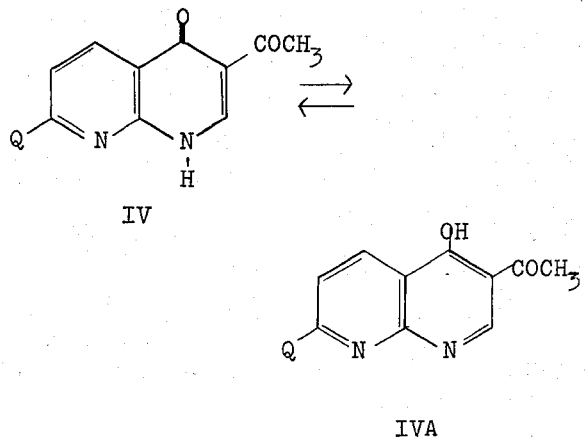

and 3-acetyl-1-(lower-alkyl)-1,4-dihydro-7-Q4-oxo-1,8-naphthyridine of the formula V

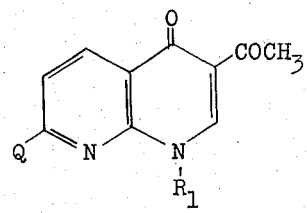

where $R_1$ is lower-alkyl and Q in each of the formulas III, IV, IVA and V is defined as hereinabove.

Preferred process and composition embodiments, because of high antibacterial activity of final products and ready availability of intermediates are those where Q is methyl, hydroxymethyl, acetoxymethyl, 4-pyridyl, 3-pyridyl, 2-methyl-4-pyridyl and 2,6-dimethyl-4-pyridyl, and Q' is like Q but excluding acetoxymethyl.

Other process aspects of the invention comprise the steps of converting the compound of formula III or IV (or IVA) where Q is methyl, that is, lower-alkyl α-(6-methyl-2-pyridylaminomethylene)acetoacetate or 3-acetyl-1,4-dihydro-7-methyl-4 - o x o-1,8-naphthyridine (or 3-acetyl-4-hydroxy-7-methyl-1,8-naphthyridine) to its 6-methyl-1-oxo-2-pyridyl derivative or 8-oxide, respectively, by reacting it with an agent capable of forming N-oxides and then reacting said 1-oxo-2-pyridyl compound or 8-oxide with a lower-alkanoic anhydride to produce the compound of formula III or IV (or IVA), respectively, where Q is lower-alkanoyloxymethyl.

The term "lower-alkyl," as used herein, e.g., as represented by R in formula III, Q in formulas III, IV, IVA and V, or $R_1$ in formula V, means alkyl radicals having from one to six carbon atoms which can be arranged as straight or branched chains, illustrated by methyl, ethyl, n-propyl, isopropyl, n-butyl, 2-butyl, isobutyl, n-amyl, n-hexyl, and the like.

The term "lower-alkoxy," as used herein, e.g., in the intermediate lower-alkyl (lower-alkoxy)methyleneacetoacetate (II), means alkoxy radicals having from one to six carbon atoms which can be arranged as straight or branched chains, illustrated by methoxy, ethoxy, n-propoxy, isopropoxy, n-butoxy, 2-butoxy, isobutoxy, n-amoxy, n-hexoxy, and the like.

The term "lower-alkanoyl," as used herein, e.g., in the definition of the Q substituent as lower-alkanoyloxymethyl in formulas III, IV, IVA and V, means alkanoyl radicals having from one to six carbon atoms, including the straight- and branched-chained radicals, illustrated by formyl, acetyl, propionyl (propanoyl), butyryl (butanoyl), isobutyryl (2-methyl- propanoyl) and caproyl (hexanoyl).

Illustrative of the Q' substituent in I or the Q substituent in formulas III, IV, IVA and V where Q' or Q is 4(or 3)-pyridyl having one or two lower-alkyl substituents are the following: 2-methyl-4-pyridyl, 2,6-dimethyl-4-pyridyl, 3-methyl-4-pyridyl, 2-methyl-3-pyridyl, 6-methyl-3-pyridyl (preferably named 2-methyl-5-pyridyl), 2,3-dimethyl-4-pyridyl, 2,5-dimethyl-4-pyridyl, 2-ethyl-4-pyridyl, 2-isopropyl-4-pyridyl, 2-n-butyl-4-pyridyl, 2-n-hexyl-4-pyridyl, 2,6-diethyl- 4-pyridyl, 2,6- diethyl-3-pyridyl, 2,6-diisopropyl-4-pyridyl, 2,6-di-n-hexyl-4-pyridyl, and the like. Because of ready availability, ease of preparation and/or high antibacterial activity of the final products, i.e., the 1-(lower-alkyl)-1,4- dihydro-7-[mono(or di)-(lower-alkyl)-4(or 3)-pyridyl]-4-oxo- 1,8-naphthyridine-3-carboxylic acids, preferred embodiments of this group are those where 4(or 3)-pyridyl is substituted by one or two methyl, especially the 2-methyl-4-pyridyl and 2,6-dimethyl-4-pyridyl compounds. Other preferred embodiments are those having unsubstituted-4(or 3)-pyridyl as Q.

As shown above, 3-acetyl-1,4-dihydro-7-Q-4-oxo-1,8-naphthyridine of formula IV is tautomeric with 3-acetyl-4-hydroxy-7-Q-1,8-naphthyridine of formula IVA. As with all tautomeric systems, the rate of the transformation IV ⇄ IVA and the ratio IV/IVA are dependent on the thermodynamic environment, including the state of aggregation; so that measurements by any particular techniques do not necessarily have validity except under the conditions of the measurement, thereby, among other consequences, giving rise to problems for any simple designation of the physical embodiments. Thus, measurements of the infrared spectra, in potassium bromide admixture, or in chloroform or mineral oil, indicate existence predominantly as IV and the names of the compounds herein therefore are preferably based on structure IV, although it is understood that either or both structures are comprehended.

The intermediate 2-amino-6-Q'-pyridines (I) are either known or, where novel, are prepared from known compounds by conventional means as illustrated hereinbelow.

The molecular structures of the composition aspects (III, IV, IVA and V) of our invention were assigned on the basis of evidence provided by infrared, ultraviolet and nuclear magnetic resonance spectra, by chromatographic mobilities, and, by the correspondence of calculated and found values for the elementary analyses for representative examples.

The manner of making and using the instant invention will now be generally described so as to enable a person skilled in the art of chemistry to make and use the same, as follows:

The reaction of 2-amino-6-Q'-pyridine (I) with lower-alkyl (lower-alkoxy)methyleneacetoacetate (II) to produce lower-alkyl α-(6-Q'-2-pyridylaminomethylene)acetoacetate (III) is carried out by mixing the reactants (I and II), preferably in a molar ratio of 1:1 and preferably with stirring, either in the absence or presence of a suitable inert solvent, at about room temperature (20°–25°C.) to about 100°C. Higher temperatures can be used but to no particular advantage. In some instances the reaction takes place exothermally. The reaction is conveniently run by mixing the reactants, preferably using ethyl ethoxymethyleneacetoacetate because of its ready availability and low cost, with stirring in a lower-alkanol, preferably ethanol, at room temperature and then warming the reaction mixture on a steam bath for a short period to ensure completion of the reaction. Other suitable solvents inert under the reaction conditions include acetonitrile, dimethylformamide, benzene, and the like.

The reaction of lower-alkyl α-(6-Q-2-pyridylaminomethylene)acetoacetate (III) to produce 3-acetyl-1,4-dihydro- 7-Q-4-oxo-1,8-naphthyridine (IV) is carried out by heating III in an inert solvent at about 200°–325°C., preferably at about 250°–300°C. Such solvents include mineral oil, diethyl phthalate, dibenzyl ether, nitrobenzene, the eutectic mixture of diphenyl and diphenyl ether (Dowtherm A), and the like.

Alternatively, the above two steps can be run consecutively without isolation of compound III.

The reaction of 3-acetyl-1,4-dihydro-7-Q-4-oxo-1,8-naphthyridine (IV) or its tautomeric 3-acetyl-4-hydroxy-7-Q-1,8-naphthyridine (IVA) with a lower-alkylating agent to produce 3-acetyl-1-(lower-alkyl)-1,4-dihydro-7-Q-4-oxo-1,8-naphthyridine (V) is generally carried out by reacting said compound of formula IV or IVA with a lower-alkyl ester of a strong inorganic acid or an organic sulfonic acid, said ester having the formula $R_1-An$, where An is an anion of a strong inorganic acid or an organic sulfonic acid, e.g., chloride, bromide, iodide, sulfate, methanesulfonate, benzenesulfonate, and para-toluensulfaonate, and $R_1$ is lower-alkyl. This alkylation is preferably run using a slight excess of the alkylating agent. The chloride, bromide or iodide is preferred because of the ready availability of the requisite lower-alkyl halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium alkoxides, potassium alkoxides, sodium amide, and the like. The acid-acceptor takes up the hydrogen halide (or HAn) which is split out during the course of the reaction and also takes up the proton from the 1-position of IV or from the 4-OH of IVA to generate the resulting anion of IV or IVA. The reaction can be carried out in either the presence of absence of a suitable solvent, but preferably in a solvent such as lower-alkanol, acetone, dioxane, dimethyl-formamide, dimethyl sulfoxide, hexamethyl phosphoramide, or a mixture of solvents, e.g., a mixture of water and a loweralkanol. The reaction is generally carried out at a temperature between about room temperature (about 20°–25°C.) and 150°C., preferably heating on a steam bath in a stirred mixture of dimethylformamide and anhydrous potassium carbonate.

The conversion of 3-acetyl-1-(lower-alkyl)-1,4-dihydro-7-Q-4-oxo-1,8-naphthyridine-3-carboxylic acid (VI) is carried out by treating V with an agent capable of converting —COCH$_3$ to COOH. This is conveniently done by reacting V with chlorine or bromine and an alkali metal hydroxide, preferably sodium or potassium hydroxide, or the corresponding alkali hypohalite. This conversion of V to VI also can be carried out by reaction V with iodine and pyridine followed by reacting the resulting —COCH$_2^+{}_{NC_5H_5}{}^-$ with alkali, e.g., aqueous sodium or potassium hydroxide solution; the reaction with the iodine and pyridine is conveniently carried out by heating the reaction mixture on a steam bath and the reaction of the resulting pyridinium iodide compound is conveniently hydrolyzed in refluxing aqueous sodium or potassium hydroxide solution. Alternatively, the conversion of V to VI is carried out by reacting V with a mixture of potassium or sodium hydroxide and carbon tetrachloride, preferably at about 25–80°C. with stirring in a suitable aqueous solvent, e.g., water and a lower-alkanol, e.g., t-butanol. Also, the conversion of V to VI is carried out by heating V with dilute aqueous nitric acid, preferably refluxing 20% nitric acid.

The reaction of lower-alkyl α-(6-methyl-2-pyridylaminomethylene)acetoacetate (III) or 3-acetyl-1,4-dihydro-7-methyl-4-oxo-1,8-naphthyridine (IV) or its tautomer (IVA) with an oxidizing agent to form, respectively, lower-alkyl α-(6-methyl-1-oxo-2-pyridylaminomethylene)acetoacetate or 3-acetyl-1,4-dihydro-7-methyl-4-oxo-1,8-naphthyridine-8-oxide or its tautomeric -8-oxide is carried out by reacting III or IV(or IVA) with an oxidizing agent capable of forming N-oxides, preferably with a per acid, e.g., peracetic acid, perbenzoic acid, 3-chloroperbenzoic acid, and the like, or with other oxidizing agents, e.g., hydrogen peroxide, in the presence of a suitable inert solvent, e.g., acetic acid, chloroform, and the like. The reaction is conveniently run by mixing the reactants carefully at room temperature (about 20°–25°C.) up to about 40°–50°C., preferably with stirring, and then heating the reaction mixture on a steam bath to ensure completion of the reaction.

The conversion of lower-alkyl α-(6-methyl-1-oxo-2-pyridylaminomethylene)acetoacetate or 3-acetyl-1,4-dihydro-7-methyl-4-oxo-1,8-naphthyridine-8-oxide (or tautomer) to the corresponding lower-alkyl α-[6-(lower-alkanoyloxymethyl)-2-pyridylaminomethylene]acetoacetate or 3-acetyl-1,4-dihydro- 7-(lower-alkanoyloxymethyl)-4-oxo-1,8-naphthyridine (or tautomer), respectively, is carried out by reacting the 6-methyl-1-oxo-2-pyridyl compound or -8-oxide with a lower- alkanoic acid anhydride. The reaction is conveniently run using as solvent an excess of the anhydride or the corresponding alkanoic acid, e.g., acetic acid with acetic anhydride, or any suitable solvent unreactive to said anhydrides, e.g., acetonitrile, benzene, toluene, dimethylformamide, and the like. This reaction is generally carried out in the range of about 70°–150°C., preferably on a steam bath.

The best mode contemplated for carrying out the invention is now set forth as follows:

EXAMPLE 1

Ethyl α-(6-methyl-2-pyridylaminomethylene)acetoacetate

To a solution containing 21.6 g. of 2-amino-6-methylpyridine in 100 ml. of ethanol was added with stirring 38 g. of ethyl ethoxymethyleneacetoacetate whereupon an exothermic reaction ensured causing the solution to warm up to about 67°C. After being allowed to stand for about 15 minutes, the reaction mixture was heated on a steam bath for 20 minutes, diluted to a volume of about 200 ml. with ethanol, allowed to cool and chilled. The resulting crystalline precipitate was collected, washed with cold ethanol, and dried in vacuo at 50°C. to yield 6.5 g. of white crystalline ethyl α-(6-methyl-2-pyridylaminomethylene)acetoacetate, m.p. 99°–101°C.

Following the procedure described above in Example 1 but using in place of ethyl ethoxymethyleneacetoacetate a molar equivalent quantity of the appropriate lower-alkyl (lower-alkoxy) methyleneacetoacetate, there are obtained: methyl α-(6-methyl-2-pyridylaminomethylene)acetoacetate using methyl methoxymethyleneacetoacetate; n-propyl α-(6-methyl-2-pyridylaminomethylene)acetoacetate using n-propyl n-propoxymethyleneacetoacetate; isobutyl α-(6-methyl-2-pyridylaminomethylene)acetoacetate using isobutyl ethoxymethyleneacetoacetate; n-hexyl α-(6-methyl-2-pyridylaminomethylene)acetoacetate using n-hexyl n-hexoxymethyleneacetoacetate; and isopropyl α-(6-methyl-2-pyridylaminomethylene) acetoacetate using isopropyl isopropoxymethyleneacetoacetate.

EXAMPLE 2

3-Acetyl-1,4-dihydro-7-methyl-4-oxo-1,8-naphthyridine

A mixture containing 34.5 g. of ethyl α-(6-methyl-2-pyridylaminomethylene)acetoacetate and 700 ml. of mineral oil was heated with stirring to a temperature of 300°C., kept at 300°C. for about 30 seconds and allowed to cool with stirring to about 100°C. The precipitate was collected, triturated with hot n-hexane and crystallized from dimethylformamide to yield 9.0 g. of 3-acetyl-1,4-dihydro-7-methyl-4-oxo-1,8-naphthyridine, m.p. 326°–329°C. A sample was purified for analysis by dissolving it in 10 percent aqueous potassium hydroxide solution, boiling the solution for about 2 minutes, neutralizing it with hydrochloric acid, and collecting the product, m.p. 338°–340°C. A mixed melting point with the original material melting at 326°–329°C. showed no depression.

The above cyclization of ethyl α-(6-methyl-2-pyridylaminomethylene)acetoacetate to produce 3-acetyl-1,4-dihydro-7-methyl-4-oxo-1,8-naphthyridine also was carried out in refluxing Dowtherm A (eutectic mixture of diphenyl and diphenyl ether) for one hour and by heating it in diethyl phthalate at 290°C. for about 5 to 10 minutes.

3-Acetyl-1,4-dihydro-7-methyl-4-oxo-1,8-naphthyridine also is produced by following the above-described procedure but using in place of ethyl α-(6-methyl-2-pyridylaminomethylene)acetoacetate a molar equivalent quantity of other lower-alkyl α-(6-methyl-2-pyridylaminomethylene)acetoacetates, e.g., methyl, n-propyl, isopropyl, isobutyl or n-hexyl α-(6-methyl-2-pyridylaminomethylene)acetoacetate.

EXAMPLE 3

3-Acetyl-1-ethyl-1,4-dihydro-7-methyl-4-oxo-1,8-naphthyridine

To a heated (on steam bath) suspension containing 16.2 g. of 3-acetyl-1,4-dihydro-7-methyl-4-oxo-1,8-naphthyridine in 175 ml. of dimethylformamide was added with stirring 16.5 g. of anhydrous potassium carbonate and the mixture stirred for about 15 minutes, during which period some dissolution had occurred. To the hot stirred mixture was added 16.2 ml. of ethyl iodide and the resulting mixture was heated with stirring for 90 minutes. The hot reaction mixture was filtered and the filtrate, from which crystals started to separate, was chilled. The crystalline product was collected, triturated with warm water, washed sparingly with acetone and dried at 60°C. in vacuo to yield 13.2 g. of 3-acetyl-1-ethyl-1,4-dihydro-7-methyl-4-oxo-1,8-naphthyridine, m.p. 179°–181°C.

EXAMPLE 4

1-Ethyl-1,4-dihydro-7-methyl-4oxo-1,8-naphthyridine-3-carboxylic acid

To a stirred solution kept at 0°–10°C. and containing 33 g. of sodium hydroxide (98 percent) in 280 ml. of water is added over a period of 15 minutes 48 g. of bromine. To this solution is added 23 g. of 3-acetyl-1-ethyl-1,4-dihydro-7-methyl-4-oxo-1,8-naphthyridine and the resulting reaction mixture is stirred for one hour at 0°–10°C., for 6 hours at room temperature (about 20°–25°C.) and for 30 minutes on a steam bath. The hot reaction mixture is filtered and the filtrate is acidified with aqueous hydrochloric acid to precipitate the product. The precipitate is collected and recrystallized from acetonitrile to yield 1-ethyl-1,4-dihydro-7-methyl-4-oxo-1,8-naphthyridine-3-carboxylic acid, m.p. 228°–230°C.

The conversion of 3-acetyl-1-ethyl-1,4-dihydro-7-methyl-4-oxo-1,8-naphthyridine to 1-ethyl-1,4-dihydro-7-methyl-4-oxo-1,8-naphthyridine-3-carboxylic acid also is carried out alternatively as follows: by warming on a steam bath for ninety minutes a mixture containing 2.42 g. of 3-acetyl-1-ethyl-1,4-dihydro-7-methyl-4-oxo-1,8-naphthyridine, 4.8 ml. of pyridine and 1.72 g. of iodine, allowing the reaction mixture to stand overnight at room temperature, removing the excess pyridine in vacuo, drying the residue in vacuo at 130°C., heating the residue under reflux for one hour in 70 ml. of 1 N potassium hydroxide solution in diethylene glycol which contained 2 ml. of water, diluting the solution with water, acidifying the solution with hydrochloric acid, extracting the mixture with ether, extracting the product from the ether with dilute sodium bicarbonate, decolorizing the resulting aqueous solution with decolorizing charcoal, acidifying the resulting solution and collecting the crystalline 1-ethyl-1,4-dihydro-7-methyl-4-oxo-1,8-naphthyridine-3-carboxylic acid.

Another conversion of said 3-acetyl compound to the 3-carboxy compound is carried out by heating a mixture containing 1 g. of the 3-acetyl compound, 4 g. of powdered potassium hydroxide, 5 ml. of t-butanol, 3 ml. of water and 10 ml. of carbon tetrachloride at 60°–70°C. for 45 minutes, and then working up the reaction mixture as in the preparation given in the immediately preceding paragraph.

In another conversion of the 3-acetyl compound to 1-ethyl-1,4-dihydro-7-methyl-4-oxo-1,8-naphthyridine-3-carboxylic acid, a 2.32 g. portion of said 3-acetyl compound is refluxed for five hours with 70 ml. of 20 percent nitric acid, the reaction mixture is evaporated to dryness in vacuo, the residue is boiled for fifteen minutes with acetic acid, the the separated 3-carboxylic acid is collected and recrystallized from acetonitrile.

Following the procedures described in Example 1 but using in place of 2-amino-6-methylpyridine a molar equivalent quantity of the appropriate 2-amino-6-Q-pyridine, the compounds of Examples 5-9 and 14-21 are obtained:

EXAMPLE 5

Ethyl α(6-ethyl-2-pyridylaminomethylene)acetoacetate using 2-amino-6-ethylpyridine.

EXAMPLE 6

Ethyl α-(6-n-propyl-2-pyridylaminomethylene)acetoacetate using 2-amino-6-n-propylpyridine.

EXAMPLE 7

Ethyl α-(6-isobutyl-2-pyridylaminomethylene)acetoacetate using 2-amino-6-isobutylpyridine, the later prepared by reacting 2-isobutylpyridine with sodamide.

EXAMPLE 8

Ethyl α-(6-n-hexyl-2-pyridylaminomethylene)acetoacetate using 2-amino-6-n-hexylpyridine, the latter prepared by reacting 2-n-hexylpyridine with sodamide.

EXAMPLE 9

Ethyl α-(6-hydroxymethyl-2-pyridylaminomethylene)acetoacetate using 2-amino-6-hydroxymethylpyridine, which is prepared by reacting 2-acetylamino-6-methylpyridine-1-oxide with acetic anhydride and hydrolyzing with aqueous potassium hydroxide solution the resulting 6-acetoxymethyl-2-acetylaminopyridine to remove both the O-acetyl and N-acetyl groups.

EXAMPLE 10

Ethyl α-(6-acetoxymethyl-2-pyridylaminomethylene)acetoacetate is prepared by reacting the 6-hydroxymethyl compound of Example 9 with acetic anhydride or in two steps by first oxidizing ethyl α-(6-methyl-2-pyridylaminomethylene)acetoacetate to form the corresponding 6-methyl-1-oxo-2-pyridyl compound and reacting the latter compound with acetic anhydride.

EXAMPLE 11

Ethyl α-(6-propionoxymethyl-2-pyridylaminomethylene)acetoacetate is prepared as in Example 10 but using propionic anhydride instead of acetic anhydride in each instance.

EXAMPLE 12

Ethyl α-(6-isobutyroxymethyl-2-pyridylaminomethylene)acetoacetate is prepared as in Example 10 but using isobutyric anhydride instead of acetic anhydride in each instance.

EXAMPLE 13

Ethyl α-(6-hexanoyloxymethyl-2-pyridylaminomethylene)acetoacetate is prepared as in Example 10 but using hexanoic acid anhydride instead of acetic anhydride in each instance.

EXAMPLE 14

Ethyl α-[6-(4-pyridyl)-2-pyridylaminomethylene]acetoacetate using 2-amino-6-(4-pyridyl)pyridine.

EXAMPLE 15

Ethyl α-[6-(3-pyridyl)-2-pyridylaminomethylene]acetoacetate using 2-amino-6-(3-pyridyl)pyridine.

EXAMPLE 16

Ethyl α-[6-(2-methyl-4-pyridyl)-2-pyridylaminomethylene]acetoacetate using 2-amino-6-(2-methyl-4-pyridyl)pyridine.

EXAMPLE 17

Ethyl α-[6-(3-methyl-4-pyridyl)-2-pyridylaminomethylene]acetoacetate using 2-amino-6-(3-methyl-4-pyridyl)pyridine.

EXAMPLE 18

Ethyl α-[6-(2-ethyl-4-pyridyl)-2-pyridylaminomethylene]acetoacetate using 2-amino-6-(2-ethyl-4-pyridyl)pyridine.

EXAMPLE 19

Ethyl α-[6-(3-ethyl-4-pyridyl)-2-pyridylaminomethylene]acetoacetate using 2-amino-6-(3-ethyl-4-pyridyl)pyridine.

EXAMPLE 20

Ethyl α-[6-(2,6-dimethyl-4-pyridyl)-2-pyridylaminomethylene]acetoacetate using 2-amino-6-(2,6-dimethyl-4-pyridyl)pyridine.

EXAMPLE 21

Ethyl α-[6-(3,5-dimethyl-4-pyridyl)-2-pyridylaminomethylene]acetoacetate using 2-amino-6-(3,5-dimethyl-4-pyridyl)pyridine.

Following the procedure described in Example 2 but using in place of ethyl α-(6-methyl-2-pyridylaminomethylene)acetoacetate a molar equivalent quantity of the appropriate ethyl α-(6-Q-2-pyridylaminomethylene)acetoacetate, the compounds of Examples 22–38 are obtained:

EXAMPLE 22

3-Acetyl-7-ethyl-1,4-dihydro-4-oxo-1,8-naphthyridine using ethyl α-(6-ethyl-2-pyridylaminomethylene)acetoacetate.

EXAMPLE 23

3-Acetyl-1,4-dihydro-4-oxo-7-n-propyl-1,8-naphthyridine using ethyl α-(6-n-propyl-2-pyridylaminomethylene)acetoacetate.

EXAMPLE 24

3-Acetyl-1,4-dihydro-7-isobutyl-4-oxo-1,8-naphthyridine using ethyl α-(6-isobutyl-2-pyridylaminomethylene)acetoacetate.

EXAMPLE 25

3-Acetyl-7-n-hexyl-1,4-dihydro-4-oxo-1,8-naphthyridine using ethyl α-(6-n-hexyl-2-pyridylaminomethylene)acetoacetate.

EXAMPLE 26

3-Acetyl-1,4-dihyro-7-hydroxymethyl-4-oxo-1,8-naphthyridine using ethyl α-(6-hydroxymethyl-2-pyridylaminomethylene)acetoacetate.

EXAMPLE 27

7-Acetoxymethyl-3-acetyl-1,4-dihydro-4-oxo-1,8-naphthyridine using ethyl α-(6-acetoxymethyl-2-pyridylaminomethylene)acetoacetate. Alternatively, 7-acetoxymethyl-3-acetyl-1,4-dihydro-4-oxo-1,8-naphthyridine is prepared by reacting 3-acetyl-1,4-dihydro-7-methyl-4-oxo-1,8-naphthyridine with peracetic acid to form its 8-oxide and reacting the 8-oxide with acetic anhydride.

EXAMPLE 28

3-Acetyl-1,4-dihydro-4-oxo-7-propionoxymethyl-1,8-naphthyridine using ethyl α-(6-propionoxymethyl-2-pyridylaminomethylene)acetoacetate. Alternatively, 3-acetyl 1,4-dihydro-4-oxo-7-propionoxymethyl-1,8-naphthyridine is prepared by reacting 3-acetyl-1,4-dihydro-7-methyl-4-oxo-1,8-naphthyridine with peracetic acid to produce its 8-oxide and reacting the 8-oxide with propionic anhydride.

EXAMPLE 29

3-Acetyl-1,4-dihydro-7-isobutyroxymethyl-4-oxo-1,8-naphthyridine using ethyl α-(6-isobutyroxymethyl-2-pyridylaminomethylene)acetoacetate. Alternatively, 3-acetyl-1,4-dihydro-7-isobutyroxymethyl-4-oxo-1,8-naphthyridine is prepared by reacting 3-acetyl-1,4-dihydro-7-methyl-4-oxo-1,8-naphthyridine with peracetic acid to produce its 8-oxide and reacting the 8-oxide with isobutyric anhydride.

EXAMPLE 30

3-Acetyl-7-hexanoyloxymethyl-1,4-dihydro-4-oxo-1,8-naphthyridine using ethyl α-(6-hexanoyloxymethyl 2-pyridylaminomethylene acetoacetate. Alternatively, 3-acetyl-7-hexanoyloxymethyl-1,4-dihydro-4-oxo-1,8-naphthyridine is prepared by reacting 3-acetyl-1,4-dihydro-7-methyl-4-oxo-1,8-naphthyridine with peracetic acid to produce its 8-oxide and reacting the 8-oxide with hexanoic acid anhydride.

EXAMPLE 31

3-Acetyl-1,4-dihydro-4-oxo-7-(4-pyridyl)-1,8-naphthyridine using ethyl α-[6-(4-pyridyl)-2-pyridylaminomethylene]acetoacetate.

EXAMPLE 32

3-Acetyl-1,4-dihydro-4-oxo-7-(3-pyridyl)-1,8-naphthyridine using ethyl α-[6-(3-pyridyl)-2-pyridylaminomethylene]acetoacetate.

EXAMPLE 33

3-Acetyl-1,4-dihydro-7-(2-methyl-4-pyridyl)-4-oxo-1,8-naphthyridine using ethyl α-[6-(2-methyl-4-pyridyl)-2-pyridylaminomethylene]acetoacetate.

EXAMPLE 34

3-Acetyl-1,4-dihydro-7-(3-methyl-4-pyridyl-4-oxo-1,8-naphthyridine using ethyl α-[6-(3-methyl-4-pyridyl)-2-pyridylaminomethylene]acetoacetate.

EXAMPLE 35

3-Acetyl-7-(2-ethyl-4-pyridyl)-1,4-dihydro-4-oxo-1,8-naphthyridine using ethyl α-[6-(2-ethyl-40-pyridyl)-2-pyridylaminomethylene]acetoacetate.

EXAMPLE 36

3-Acetyl-7-(3-ethyl-4-pyridyl)-1,4-dihydro-4-oxo-1,8-naphthyridine using ethyl α-[6-(3-ethyl-4-pyridyl)-2-pyridylaminomethylene]acetoacetate.

EXAMPLE 37

3-Acetyl-1,4-dihydro-7-(2,6-dimethyl-4-pyridyl)-4-oxo-1,8-naphthyridine using ethyl α-[6-(2,6-dimethyl-4-pyridyl)-2-pyridylaminomethylene]acetoacetate.

EXAMPLE 38

3-Acetyl-1,4-dihydro-7-(3.5-dimethyl-4-pyridyl)-4-oxo-1,8-naphthyridine using ethyl α-[6-(3,5-dimethyl)-4-pyridyl)-2-pyridylaminomethylene]acetoacetate.

Following the procedure described in Example 3 but using in place of 3-acetyl-1,4-dihydro-7-methyl-4-oxo-1,8-naphthyridine a molar equivalent quantity of the appropriate 3-acetyl-1,4-dihydro-4-oxo-7-Q-1,8-naphthyridine, the compounds of Examples 39–55 are obtained:

EXAMPLE 39

3-Acetyl-1,7-diethyl-1,4-dihydro-4-oxo-1,8-naphthyridine using 3-acetyl-7-ethyl-1,4-dihydro-4-oxo-1,8-naphthyridine. Similarly, using said 7-ethyl compound and a molar equivalent quantity of dimethyl sulfate, n-propyl iodide, isobutyl bromide or n-hexyl chloride in place of ethyl iodide, there is obtained 3-acetyl-7-ethyl-1,4-dihydro-1-methyl-4-oxo-1,8-naphthyridine, 3-acetyl-7-ethyl-1,4-dihydro-4-oxo-1-n-propyl-1,8-naphthyridine, 3-acetyl-7-ethyl-1,4-dihydro-1-isobutyl-4oxo-1,8-naphthyridine or 3-acetyl-7-ethyl-1-n-hexyl-1,4-dihydro-4-oxo-1,8-naphthyridine, respectively.

EXAMPLE 40

3-Acetyl-1-ethyl-1,4-dihydro-4-oxo-7-n-propyl-1,8-naphthyridine using 3-acetyl-1,4-dihydro-4-oxo-7-n-propyl-1,8-naphthyridine.

EXAMPLE 41

3-Acetyl-1-ethyl-1,4-dihydro-7-isobutyl-4-oxo-1,8-naphthyridine using 3-acetyl-1,4-dihydro-7-isobutyl-4-oxo-1,8-naphthyridine.

EXAMPLE 42

3-Acetyl-1-ethyl-7n-hexyl-1,4-dihydro-4-oxo-1,8-naphthyridine using 3-acetyl-7-n-hexyl-1,4-dihydro-4-oxo-1,8-naphthyridine.

EXAMPLE 43

3-Acetyl-1-ethyl-1,4-dihydro-7-hydroxymethyl-4-oxo-1,8-naphthyridine using 3-acetyl-1,4-dihydro-7-hydroxymethyl-4-oxo-1,8-naphthyridine. Similarly, using said 7-hydroxymethyl compound and a molar equivalent quantity of dimethyl sulfate, n-propyl iodide, isobutyl bromide or n-hexyl chloride in place of ethyl iodide, there is obtained 3-acetyl-1,4-dihydro-7-hydroxymethyl-1-methyl-4-oxo-1,8-naphthyridine, 3-acetyl-1,4-dihydro-7-hydroxymethyl-4-oxo-1-n-propyl-1,8-naphthyridine, 3-acetyl-1,4-dihydro-7-hydroxymethyl-1-isobutyl-4-oxo-1,8-naphthyridine, 3-acetyl-1-n-hexyl-1,4-dihydro-7-hydroxymethyl-4-oxo-1,8-naphthyridine, respectively.

EXAMPLE 44

7-Acetoxymethyl-3-acetyl-1-ethyl-1,4-dihydro-4-oxo-1,8-naphthyridine using 7-acetoxymethyl-3-acetyl-1,4-dihydro-4-oxo-1,8-naphthyridine.

EXAMPLE 45

3-Acetyl-1-ethyl-1,4-dihydro-4-oxo-7-propionoxymethyl-1,8-naphthyridine using 3-acetyl-1,4-dihydro-4-oxo-7-propionoxymethyl-1,8-naphthyridine.

EXAMPLE 46

3-Acetyl-1-ethyl-1,4-dihydro-7-isobutyroxymethyl-4-oxo-1,8-naphthyridine using 3-acetyl-1,4-dihydro-7-isobutyroxymethyl-4-oxo-1,8-naphthyridine.

EXAMPLE 47

3-Acetyl-1-ethyl-7-hexanoyloxymethyl-1,4-dihydro-4-oxo-1,8-anphthyridine using 3-acetyl-7hexanoyloxymethyl-1,4-dihydro-4-oxo-1,8-naphthyridine.

EXAMPLE 48

3-Acetyl-1ethyl-1,4-dihydro-4-oxo-7-(4-pyridyl)-1,8-naphthyridine using 3-acetyl-1,4-dihydro-4-oxo-7-(4-pyridyl)-1,8-naphthyridine. Similarly, using said 7-(4-pyridyl) compound and a molar equivalent quantity of dimethyl sulfate, n-propyl iodide, isobutyl bromide or n-hexyl chloride in place of ethyl iodide, there is obtained 3-acetyl-1,4-dihydro-1-methyl-4-oxo-7-(4-pyridyl)-1,8-naphthyridine, 3-acetyl-1,4-dihydro-4-oxo-1-n-propyl-7-(4-pyridyl)-1,8-naphthyridine, 3-acetyl-1,4-dihydro-1-isobutyl-4-oxo-7-(4-pyridyl)-1,8-naphthyridine or 3-acetyl-1-n-hexyl-1,4-dihydro-4-oxo-7-(4-pyridyl)-1,8-naphthyridine, respectively.

EXAMPLE 49

3-Acetyl-1-ethyl-1,4-dihydro-4-oxo-7-(3-pyridyl)-1,8-naphthyridine using 3-acetyl-1,4-dihydro-4-oxo-7-(3-pyridyl)-1,8-naphthyridine.

EXAMPLE 50

3-Acetyl-1ethyl-1,4-dihydro-7-(2-methyl-4-pyridyl)-4-oxo-1,8-naphthyridine using 3-acetyl-1,4-dihydro-7-(2-methyl-4-pyridyl)-4-oxo-1,8-naphthyridine.

EXAMPLE 51

3-Acetyl-1-ethyl-1,4-dihydro-7-(3-methyl-4-pyridyl)-1,8-naphthyridine using 3-acetyl-1,4-dihydro-7-(3-methyl-4-pyridyl)-4-oxo-1,8-naphthyridine.

EXAMPLE 52

3-Acetyl-1-ethyl-7-(2-ethyl-4-pyridyl)-1,4-dihydro-4-oxo-1,8-naphthyridine using 3-acetyl-7-(2-ethyl-4-pyridyl)-1,4-dihydro-4-oxo-1,8-naphthyridine.

EXAMPLE 53

3Acetyl-1-ethyl-7-(3-ethyl-4-pyridyl)-1,4-dihydro-4-oxo-1,8-naphthyridine using 3-acetyl-7-(3-ethyl-4-pyridyl)-1,4-dihydro-4-oxo-1,8-naphthyridine.

EXAMPLE 54

3-Acetyl-1-ethyl-1,4-dihydro-7-(2,6-dimethyl-4pyridyl)-4-oxo-1,8-naphthyridine using 3-acetyl-1,4-dihydro-7-(2,6-dimethyl-4-pyridyl)-4-oxo-1,8-naphthyridine.

EXAMPLE 55

3Acetyl-1-ethyl-1,4-dihydro-7-(3,5-dimethyl-4-pyridyl)-4-oxo-1,8-naphthyridine using 3-acetyl-1,4-dihydro-7-(3,5-dimethyl-4-pyridyl)-4-oxo1,8-naphthyridine.

Following the procedure described in Example 4 but using a molar equivalent quantity of the appropriate 3-acetyl-1alkyl-1,4-dihydro-4-oxo-7-Q-1,8-naphthyridine in place of 3-acetyl-1ethyl-1,4-dihydro-7-methyl-4-oxo-1,8-naphthyridine, there are obtained the corresponding 1-alkyl-1,4-dihydro-4-oxo-7-Q-1,8-naphthyridine-3-carboxylic acids of Examples 56–84.

EXAMPLE 56

1,7-diethyl-1,4-dihydro-4-oxo-1,8-naphthyridine-3-carboxylic acid using 3-acetyl-1,7-diethyl-1,4-dihydro-4-oxo-1,8-naphthyridine.

EXAMPLE 57

7-Ethyl-1,4-dihydro-1-methyl-4-oxo-1,8-naphthyridine-3-carboxylic acid using 3-acetyl-7-ethyl-1,4-dihydro-1-methyl-4-oxo-1,8-naphthyridine.

EXAMPLE 58

7-Ethyl-1,4-dihydro--oxo-1-n-propyl-1,8-naphthyridine-3-carboxylic acid using 3-acetyl-7-ethyl-1,4-dihydro-4-oxo-1-n-propyl-1,8-naphthyridine.

EXAMPLE 59

7-Ethyl-1,4-dihydro-1-isobutyl-4-oxo-1,8-naphthyridine-3-carboxylic acid using 3-acetyl-7-ethyl-1,4-dihydro-1-isobutyl-4-oxo-1,8-naphthyridine.

EXAMPLE 60

7-Ethyl-1-n-hexyl-1,4-dihydro-4-oxo-1,8-naphthyridine-3-carboxylic acid using 3-acetyl-7-ethyl-1-n-hexyl-1,4-dihydro-4-oxo-1,8-naphthyridine.

EXAMPLE 61

1-Ethyl-1,4-dihydro-4-oxo-7-n-propyl-1,8-naphthyridine-3-carboxylic acid using 3-acetyl-1-ethyl-1,4-dihydro-4-oxo-7-n-propyl-1,8-naphthyridine.

EXAMPLE 62

1-Ethyl-1,4-dihydro-7-isobutyl-4-oxo-1,8-naphthyridine-3-carboxylic acid using 3-acetyl-1-ethyl-1,4-dihydro-7-isobutyl-4-oxo-1,8-naphthyridine.

EXAMPLE 63

1-Ethyl-7-n-hexyl-1,4-dihydro-4-oxo-1,8-naphthyridine-3-carboxylic acid using 3-acetyl-1-ethyl-7-n-hexyl-1,4-dihydro-4-oxo-1,8-naphthyridine.

EXAMPLE 64

1-Ethyl-1,4-dihydro-7-hydroxymethyl-4-oxo-1,8-naphthyridine-3-carboxylic acid using 3-acetyl-1-ethyl-1,4-dihydro-7-hydroxymethyl-4-oxo-1,8-naphthyridine.

EXAMPLE 65

1,4-Dihydro-7-hydroxymethyl-1-methyl-4-oxo-1,8-naphthyridine-3-carboxylic acid using 3-acetyl-1,4-dihydro-7-hydroxymethyl-1-methyl-4-oxo-1,8-naphthyridine.

EXAMPLE 66

1,4-Dihydro-7-hydroxymethyl-4-oxo-1-n-propyl-1,8-naphthyridine-3-carboxylic acid using 3-acetyl-1,4-dihydro-7-hydroxymethyl-4-oxo-1-n-propyl-1,8-naphthyridine.

EXAMPLE 67

1,4-Dihydro-7-hydroxymethyl-1-isobutyl-4-oxo-1,8-naphthyridine-3-carboxylic acid using 3-acetyl-1,4-dihydro-7-hydroxymethyl-1-isobutyl-4-oxo-1,8-naphthyridine.

EXAMPLE 68

1-n-Hexyl-1,4-dihydro-7-hydroxymethyl-4-oxo-1,8-naphthyridine-3-carboxylic acid using 3-acetyl-1-n-hexyl-1,4-dihydro-7-hydroxymethyl-4-oxo-1,8-naphthyridine.

EXAMPLE 69

7-Acetoxymethyl-1-ethyl-1,4-dihydro-4-oxo-1,8-naphthyridine13-carboxylic acid using 7-acetoxymethyl-3-acetyl-1-ethyl-1,4-dihydro-4-oxo-1,8-naphthyridine.

EXAMPLE 70

1-Ethyl-1,4-dihydro-4-oxo-7-propionoxy-methyl-1,8-naphthyridine-3-carboxylic acid using 3-acetyl-1-ethyl-1,4-dihydro-4-oxo-7-propionoxymethyl-1,8-naphthyridine.

EXAMPLE 71

1-Ethyl-1,4-dihydro-7-isobutyroxymethyl-4-oxo-1,8-naphthyridine-3-carboxylic acid using 3-acetyl-1-ethyl-1,4-dihydro-7-isobutyroxymethyl-4-oxo-1,8-naphthyridine.

EXAMPLE 72

1-Ethyl-7-hexanoyloxymethyl-1,4-dihydro-4-oxo-1,8-naphthyridine-3-carboxylic acid using 3-acetyl-1-ethyl-7-hexanoyloxymethyl-1,4-dihydro-4-oxo-1,8-naphthyridine.

EXAMPLE 73

1-Ethyl-1,4-dihydro-4-oxo-7-(4-pyridyl)-1,8-naphthyridine-3-carboxylic acid using 3-acetyl-1-ethyl-1,4-dihydro-4-oxo-7(4-pyridyl)-1,8-naphthyridine.

EXAMPLE 74

1,4-Dihydro-1methyl-4-oxo-7-(4-pyridyl)-1,8-naphthyridine-3-carboxylic acid using 3-acetyl-1,4-dihydro-1-methyl-4-oxo-7-(4-pyridyl)-1,8-naphthyridine.

EXAMPLE 75

1,4-Dihydro-4-oxo-1-n-propyl-7-(4-pyridyl)-1,8-naphthyridine-3-carboxylic acid using 3-acetyl-1,4-dihydrol-4-oxo-1-n-propyl-7-(4-pyridyl)-1,8-naphthyridine.

EXAMPLE 76

1,4-Dihydro-1-isobutyl-4-oxo-7-(4-pyridyl)-1,8-naphthyridine-3-carboxylic acid using 3-acetyl-1,4-dihydro-1-isobutyl-4-oxo-7-(4-pyridyl)-1,8-naphthyridine.

EXAMPLE 77

1-n-Hexyl-1,4-dihydro-4-oxo-7-(4-pyridyl)-1,8-naphthyridine-3-carboxylic acid using 3-acetyl-1-n-hexyl-1,4-dihydro-4-oxo-7-(4-pyridyl)-1,8-naphthyridine.

EXAMPLE 78

1-Ethyl-1,4-dihydro-4-oxo-7-(3-pyridyl)-1,8-naphthyridine-3-carboxylic acid using 3-acetyl-1-methyl-1,4-dihydro-4-oxo-7-(3-pyridyl)-1,8-naphthyridine.

EXAMPLE 79

1-Ethyl-1,4-dihydro-7-(2-methyl-4-pyridyl)-4-oxo-1,8-naphthyridine-3-carboxylic acid using 3-acetyl-1-ethyl-1,4-dihydro-7-(2-methyl-4-pyridyl)-4-oxo-1,8-naphthyridine.

EXAMPLE 80

1-Ethyl-1,4-dihydro-7-(3-methyl-4-pyridyl)-1,8-naphthyridine-3-carboxylic acid using 3-acetyl-1-ethyl-1,4-dihydro-7-(3-methyl-4-pyridyl)-1,8-naphthyridine.

EXAMPLE 81

1-Ethyl-7-(2-ethyl-4-pyridyl)-1,4-dihydro-4-oxo-1,8-naphthyridine-3-carboxylic acid using 3-acetyl-1-ethyl-7-(2-ethyl-4-pyridyl)-1,4-dihydro-4-oxo-1,8-naphthyridine.

EXAMPLE 82

1-Ethyl-7-(3-ethyl-4-pyridyl)-1,4-dihydro-4-oxo-1,8-naphthyridine-3-carboxylic acid using 3-acetyl-1-ethyl-7-(3-ethyl-4-pyridyl)-1,4-dihydro-4-oxo-1,8-naphthyridine.

EXAMPLE 83

1-Ethyl-1,4-dihydro-7-(2,6-dimethyl-4-pyridyl)-4-oxo-1,8-naphthyridine-3-carboxylic acid using 3-acetyl-1-ethyl-1,4-dihydro-7-(2,6-dimethyl-4-pyridyl)-4-oxo-1,8-naphthyridine.

EXAMPLE 84

1-Ethyl-1,4-dihydro-7-(3,5-dimethyl-4-pyridyl)-4-oxo-1,8-naphthyridine-3-carboxylic acid using 3-acetyl-1-ethyl-1,4-dihydro-7-(3,5-dimethyl-4-pyridyl)-4-oxo-1,8-naphthyridine.

We claim:

1. A compound selected from 3-acetyl-1,4-dihydro-7-Q-4-oxo-1,8-naphthyridine and its tautomeric 3-acetyl-4-hydroxy-7-Q-1,8-naphthyridine, where Q is lower-alkyl, loweralkanoyloxymethyl, hydroxymethyl, 4(or 3)-pyridyl or 4(or 3)-pyridyl having one or two lower-alkyl substituents.

2. The compound according to claim 1 where Q is methyl.

3. 3-Acetyl-1-(lower-alkyl)-1,4-dihydro-7Q-4-oxo-1,8-naphthyridine, where Q is lower-alkyl, hydroxymethyl, lower-alkanoyloxymethyl, 4(or 3)-pyridyl or 4(or 3)-pyridyl having one or two lower-alkyl substituents.

4. 3-Acetyl-1-ethyl-1,4-dihydro-7-methyl-4-oxo-1,8-naphthyridine according to claim 3.

* * * * *

UNITED STATES PATENT OFFICE
CERTIFICATE OF CORRECTION

PATENT NO. : 3,925,398
DATED : December 9, 1975
INVENTOR(S) : George Y. Lesher and Ruth Pauline Brundage It is certified that error appears in the above-identified patent and that said Letters Patent are hereby corrected as shown below:

Column 1, line 36, "pyridylaminomethylene- acetoacetate" should read -- pyridylaminomethylene)acetoacetate --.

Column 2, line 1, "7-Q4-" should read -- 7-Q-4- --.

Column 4, line 15, "-toluensulfaonate" should read -- -toluenesulfonate --.

Column 4, line 44, following "1,8-naphthyridine" insert -- (V) to 1-(lower-alkyl)-1,4-dihydro-7-Q-4-oxo-1,8-naphthyridine --.

Column 4, line 52, "-COCH$_2^{\oplus}$NC$_5$H$_5$I$^{\ominus}$" should read -- -COCH$_2^{\oplus}$NC$_5$H$_5$I$^{\ominus}$ --.

Column 16, line 5, "7Q-4" should read -- 7-Q-4 --.

Signed and Sealed this

Twenty-fourth Day of August 1976

[SEAL]

Attest:

RUTH C. MASON
Attesting Officer

C. MARSHALL DANN
Commissioner of Patents and Trademarks